United States Patent [19]
Jacobs et al.

[11] Patent Number: 5,782,260
[45] Date of Patent: Jul. 21, 1998

[54] HYDRAULIC FLOW PRIORITY VALVE

[75] Inventors: Barry Howard Jacobs, Belleville; Roger Wayne Gettel, Bloomfield Hills; John Allen Oliver, Jr., Canton, all of Mich.

[73] Assignee: Ford Global Technologies, Inc., Dearborn, Mich.

[21] Appl. No.: 566,628

[22] Filed: Dec. 4, 1995

[51] Int. Cl.$^6$ ............................................. B62D 5/07
[52] U.S. Cl. ........................... 137/118.02; 137/118.04
[58] Field of Search .................... 137/118.02, 118.04, 137/115.05, 115.1

[56] References Cited

U.S. PATENT DOCUMENTS

| | | | |
|---|---|---|---|
| 2,445,544 | 7/1948 | Trautman | 137/152.5 |
| 2,462,983 | 3/1949 | MacDuff et al. | 137/118.02 |
| 2,737,196 | 3/1956 | Eames | 137/101 |
| 2,818,711 | 1/1958 | Loncoln et al. | 137/118.02 |
| 3,618,628 | 11/1971 | Krämer | 137/101 |
| 4,192,337 | 3/1980 | Alderson et al. | 137/101 |
| 4,552,168 | 11/1985 | Chatterjea | 137/101 |
| 4,561,521 | 12/1985 | Duffy | 180/142 |
| 4,570,667 | 2/1986 | Masica et al. | 137/115.05 |
| 4,714,413 | 12/1987 | Duffy | 180/423 |
| 4,760,892 | 8/1988 | Duffy | 180/142 |
| 4,840,244 | 6/1989 | Broucksou | 137/115.1 |
| 4,877,099 | 10/1989 | Duffy | 180/142 |

Primary Examiner—Stephen M. Hepperle
Attorney, Agent, or Firm—Gregory P. Brown; Roger L. May

[57] ABSTRACT

A flow priority valve receives input fluid flow and divides the fluid flow between a primary device and a secondary device. The valve comprises a valve body have a bore formed therein, the bore having first and second ends and first and second annular channels formed in communication with the bore. The valve body further includes an input flow channel formed in communication with the bore for receiving the input fluid flow. A spool is movable within the bore and has a first land and a second land adjacent opposing ends of the spool. A spring is positioned within the bore for biasing the spool towards the first end of the bore. An electronically variable orifice (EVO) for electronically adjusting flow includes an EVO input portion in fluid communication with both the first annular channel and the first end of the bore, and an EVO output portion in fluid communication with both the second end of the bore and the primary device. The second annular channel is in fluid communication with the secondary device. The first and second lands are movable with the spool for selectively limiting flow from the bore to the first and second annular channels, respectively. The valve may be used for remote flow control, splitting between primary and secondary devices, and two such valves may be used to provide variable control to two devices.

13 Claims, 3 Drawing Sheets

HYDRAULIC FLOW PRIORITY VALVE

TECHNICAL FIELD

The present invention relates to a flow priority valve and, more particularly, to a priority valve which automatically adjusts for varying input flow conditions in order to maintain desired primary output flow rates while responding to various operating variables.

BACKGROUND OF THE INVENTION

A flow priority valve is a spool valve which uses the relationship between flow rate and the pressure drop across an orifice to provide a constant rate of flow to a primary device while diverting excess flow elsewhere. The flow rate to the primary device is determined by the size of, and hence the pressure drop across, the orifice. If the input flow from the pump increases or decreases, the change in pressure drop across the orifice will result in a force imbalance on the spool, causing it to change position while being biased by a spring preload. As the spool changes position, it selectively increases or decreases the cross-sectional flow area to the orifice, which increases or decreases flow through the orifice. Accordingly, the priority valve automatically adjusts for varying input flow conditions in order to maintain the desired primary output flow rate. Excess flow is directed to a reservoir or secondary device.

Commercially available priority valves, such as Parker FP101, use a fixed orifice. The primary flow rate is adjusted by manually increasing or decreasing the spring preload acting on the spool. This type of device cannot provide real time orifice adjustment in response to operating variables.

The prior art provides various priority valves, such as U.S. Pat. Nos. 2,445,544, 3,618,628, and 4,192,337, which allow one pump to power two devices while giving one device a higher priority. However, none of these references provide means for real time control of the orifice size in response to operating variables. A flow priority valve which merely provides constant output flow to a primary device is not always sufficient, particularly in vehicle applications in which flow to devices, such as a steering gear, is preferably adjustable in response to vehicle speed, abruptness of turns, or other vehicle operating variables.

SUMMARY OF THE INVENTION

The present invention overcomes the above-referenced shortcomings of prior art flow priority valves by providing a flow priority valve with an electronically variable orifice for electronically adjusting fluid flow. With electronically variable flow control, the amount of flow directed to the primary device, and thus indirectly to the secondary device, can be adjusted automatically by a control unit in response to certain operating variables (e.g., vehicle speed, abruptness of turn, etc.).

More specifically, the present invention provides a flow priority valve for receiving an input fluid flow and dividing the fluid flow between a primary device and a secondary device, the valve comprising a valve body having a bore formed therein, the bore having first and second ends and first and second annular channels formed in communication with the bore. The valve body further includes an input flow channel formed in communication with the bore for receiving the input fluid flow. A spool is movable within the bore and has a first land and a second land adjacent opposing ends of the spool. A spring is positioned within the bore for biasing the spool towards the first end of the bore. An electronically variable orifice (EVO) for electronically adjusting flow includes an EVO input portion in fluid communication with both the first annular channel and the first end of the bore, and an EVO output portion in fluid communication with both the second end of the bore and the primary device. The second annular channel is in fluid communication with the secondary device. The first and second lands are movable with the spool for selectively limiting flow from the bore to the first and second annular channels, respectively.

A further aspect of the present invention provides a flow priority circuit comprising a reservoir, a pump in fluid communication with the reservoir, a priority valve in fluid communication with the pump, a primary device in fluid communication between the priority valve and the reservoir, and a secondary device in fluid communication between the priority valve and the reservoir. The priority valve is as described above.

Accordingly, an object of the present invention is to provide a flow priority valve with an electronically variable orifice which can be adjusted automatically by a control unit in response to various operating variables for controlling flow rate.

The above object and other objects, features and advantages of the present invention will become apparent upon reading the following description therefor together with reference to the accompanying drawings.

DETAILED DESCRIPTION OF THE PREFERRED EMBODIMENTS

Figure 1:
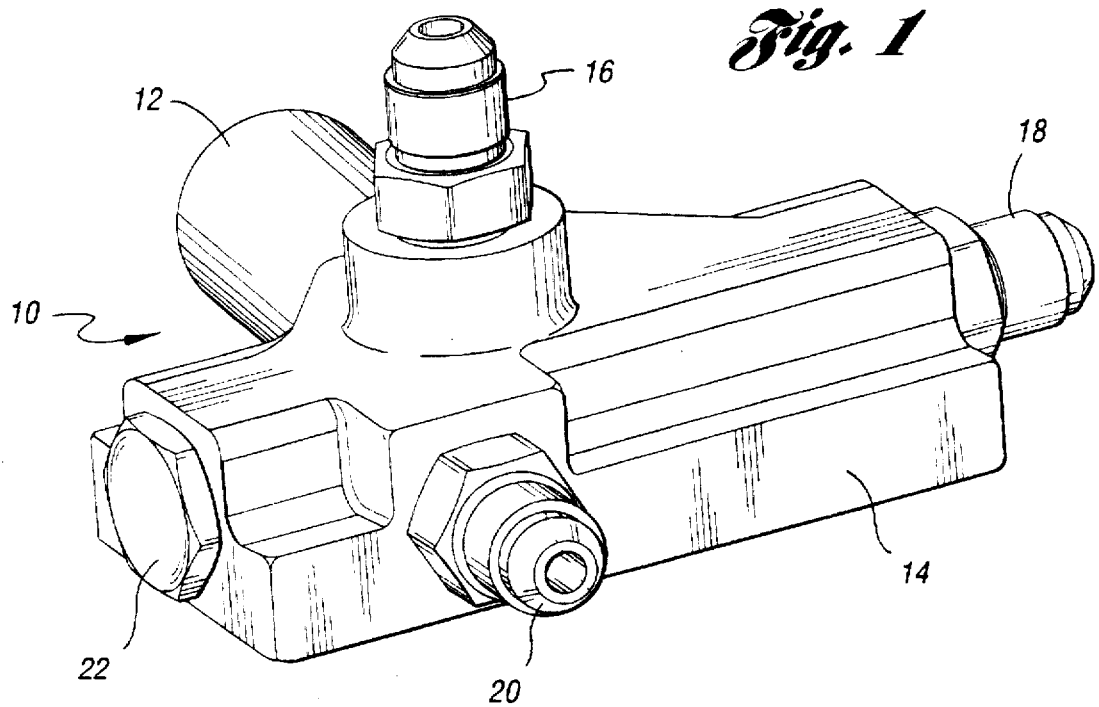
FIG. 1 shows a perspective view of a hydraulic flow priority valve in accordance with the present invention.

FIG. 1 shows a perspective view of a flow priority valve 10 having an electronically variable orifice (EVO) 12 secured in communication with the valve body 14. The valve body 14 includes apertures for receiving an input plug 16, a primary device plug 18, a secondary device plug 20, and a stop plug 22. The flow priority valve 10 receives flow through the input plug 16 and divides the flow between the primary device 18 and secondary device 20, while providing electronic orifice control with the EVO 12.

Figure 2:
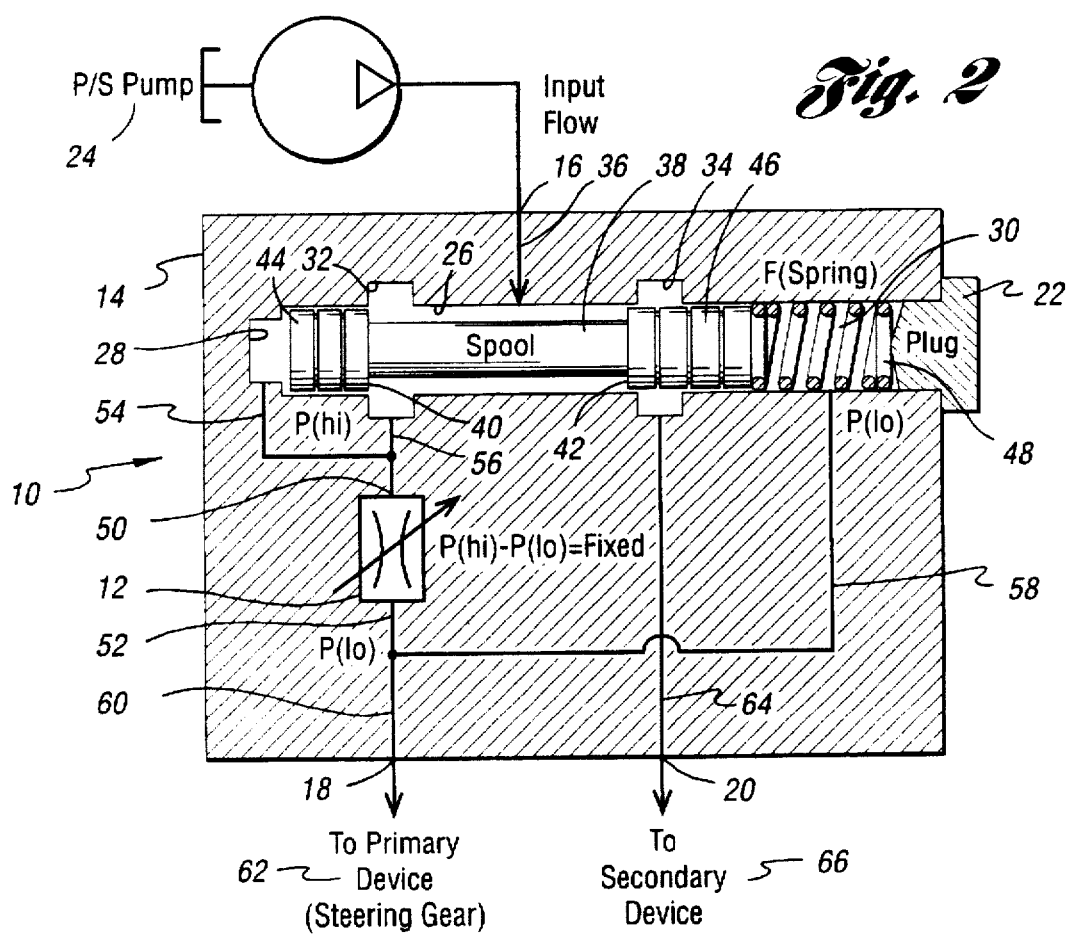
FIG. 2 shows a schematic illustrating operation of a flow priority valve in accordance with the present invention.

FIG. 2 schematically illustrates the operation of the flow priority valve 10. The pump 24 provides input flow through the input plug 16 into the valve body 14, where it enters the bore 26. The bore 26 has first and second ends 28, 30, and first and second annular channels 32, 34 formed in communication with the bore 26. An input flow channel 36 carries input fluid flow from the input plug 16 into the bore 26.

A movable spool 38 is disposed within the bore 26. The spool includes first and second lands 40, 42 adjacent opposing ends of the spool 38. The first and second lands 40, 42 are formed by first and second enlarged cylindrical portions 44, 46. The first and second lands 40, 42 are used to selectively restrict fluid communication between the first and second annular channels 32, 34 and the bore 26, respectively. A spring 48 biases the spool 38 toward the first end 28 of the bore 26. The stop plug 22 supports the spring 48 and encloses the second end 30 of the bore 26. Movement of the spool toward the first end 28 of the bore 26 is limited by the insert 31 (shown in FIG. 6).

The electronically variable orifice 12 has an input side 50 and an output side 52. A first conduit 54 provides fluid communication between the first end 28 of the bore 26 and the EVO input 50. A second conduit 56 provides fluid communication between the first annular channel 32 and the EVO input 50. A third conduit 58 provides fluid communication between the second end 30 of the bore 26 and the EVO output 52. The EVO output 52 communicates with a fourth conduit 60 which carries output flow to the primary device plug 18, which leads to the primary device 62. The second annular channel 34 communicates with a fifth conduit 64, which carries fluid to the secondary device plug 20, which leads to the secondary device 66.

In operation, travel of the spool 26 is determined by the forces exerted by P(hi) at the first end 28 of the bore 26, and P(lo) at the second end 30 of the bore 26 plus the spring force F(spring) at the second end 30 of the bore 26. The pressure difference P(hi) minus P(lo) across the variable orifice 12 is a function of the flow rate through it, with higher flow rate resulting in an increased pressure difference. At a specified flow rate, the forces on the spool 38 will be at equilibrium:

$$P(hi) \times area = P(lo) \times area + F(spring)$$

The area in the formula is the cross-sectional area at the opposing ends of the spool 38. As the input flow rate increases, the pressure difference across the variable orifice 12 also increases, and the force balance across the spool becomes:

$$P(hi) \times area > P(lo) \times area + F(spring)$$

This causes the spool 38 to begin moving toward the second end 30 of the bore 26, reducing the flow through the variable orifice 12 back to its specified value, and establishing a new equilibrium with the excess flow directed to the secondary device 66.

In other words, the flow priority valve 10 uses the relationship between flow rate and the pressure drop across an orifice to provide a desired rate of flow to a primary device, while diverting excess flow elsewhere. The flow rate to the primary device is determined by the size of, and hence the pressure drop across, the orifice. If the input flow from the pump 24 increases or decreases, the change in pressure drop across the orifice will result in a force imbalance on the spool, causing it to change position while being biased by a spring preload. As the spool 38 changes position, it selectively increases or decreases the cross-sectional flow area to the orifice by the lands 40, 42 interfering with flow between the bore 26 and the first and second annular channels 32, 34, respectively. Accordingly, the priority valve 10 automatically adjusts for varying input flow conditions in order to maintain the desired primary output flow rate.

Because the electronically variable orifice 12 is electronically adjustable, the orifice can be varied during operation to accommodate different conditions based upon various operating variables. For example, when used in a vehicle hydraulic power steering pump, this flow priority valve could be adjusted in real time based upon driving conditions, such as vehicle speed or abruptness of turn. The vehicle computer controls the valve based upon such operating conditions. This proves useful in applications such as variable assist power steering.

Adjustments to the primary flow rate will also affect the secondary flow rate because the total flow rate will remain constant. If there is a concern that the secondary flow rate will become too great, or if there is a need for more control of the secondary flow rate, a second priority valve may be used in conjunction with the first. In this manner, the flow to the secondary device can be varied, although it still receives a lower priority than the primary device.

Figure 3:
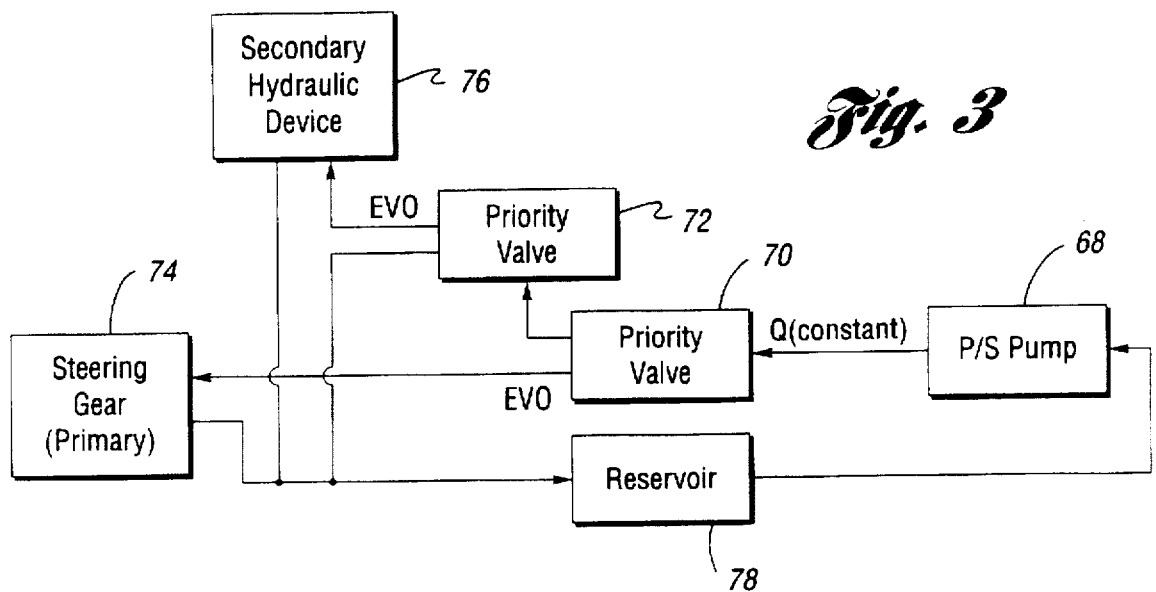
FIG. 3 shows a system schematic for a first flow system embodiment for use in accordance with the present invention.
Figure 4:
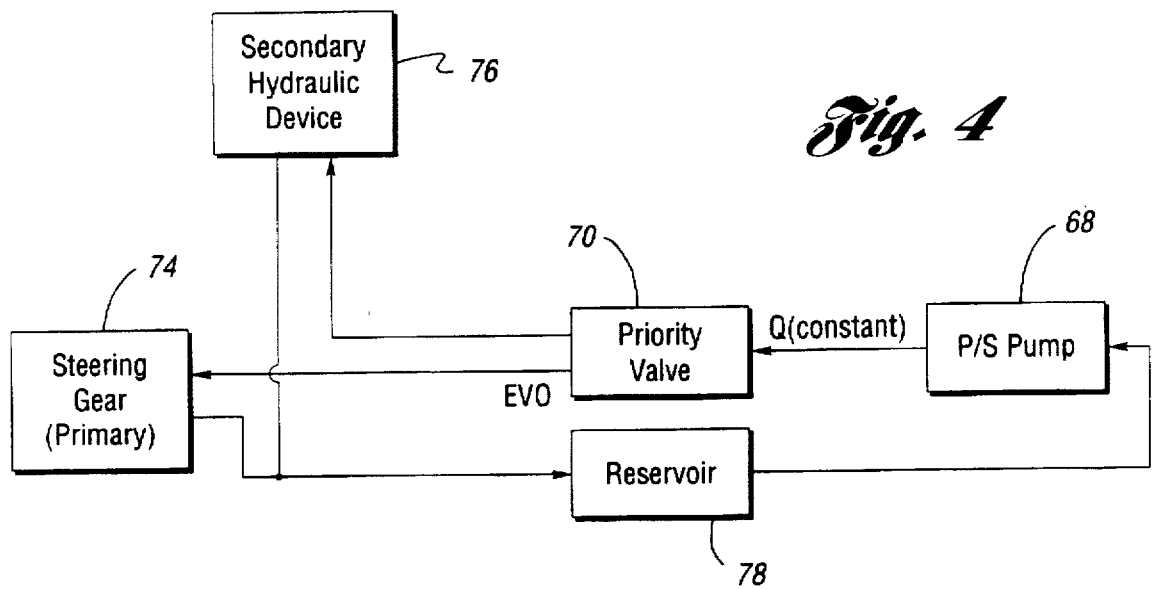
FIG. 4 shows a system schematic for a second flow system embodiment for use in accordance with the present invention.
Figure 5:
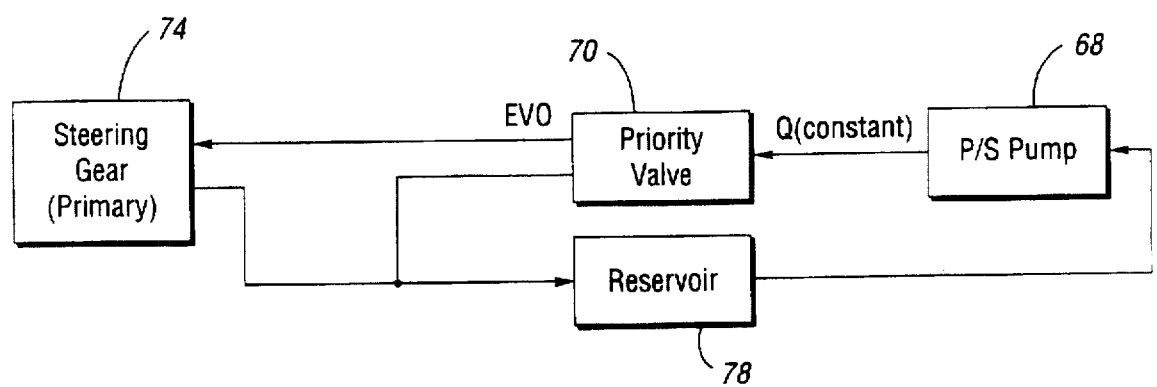
FIG. 5 shows a system schematic for a third flow system embodiment for use in accordance with the present invention.

FIGS. 3–5 illustrate various system schematics for use with a priority valve in accordance with the present invention. As mentioned above, if variable flow is desirable for both the primary and secondary devices, a system such as that shown in FIG. 3 can be used. As shown in FIG. 3, a pump 68 provides constant flow to a first priority valve 70, which divides the flow between a second priority valve 72 and a steering gear (the primary device) 74. The second priority valve 72 then divides flow between a secondary hydraulic device 76 and the system reservoir 78. Flow entering the secondary hydraulic device 76 or the primary device 74 exits to the system reservoir 78, where it returns to the pump 68.

FIG. 4 shows a system schematic for use in providing variable flow to the primary device with excess flow being directed to the secondary device. Flow from the pump 68 enters the priority valve 70, where it is split between the secondary hydraulic device 76 and the steering gear 74 (the primary device). Return flow from the primary and secondary devices 74, 76 enter the reservoir 78, where they are directed back to the pump 68. As shown in FIG. 5, the valve 70 may also be used as a remote electronically variable flow control for the primary device 74 only. Again, the pump 68 provides fluid flow to the priority valve 70, where it is divided between the primary device 74 and the reservoir 78. Return flow from the primary device 74 enters the reservoir 78, where it is directed back to the pump 68.

Figure 6:
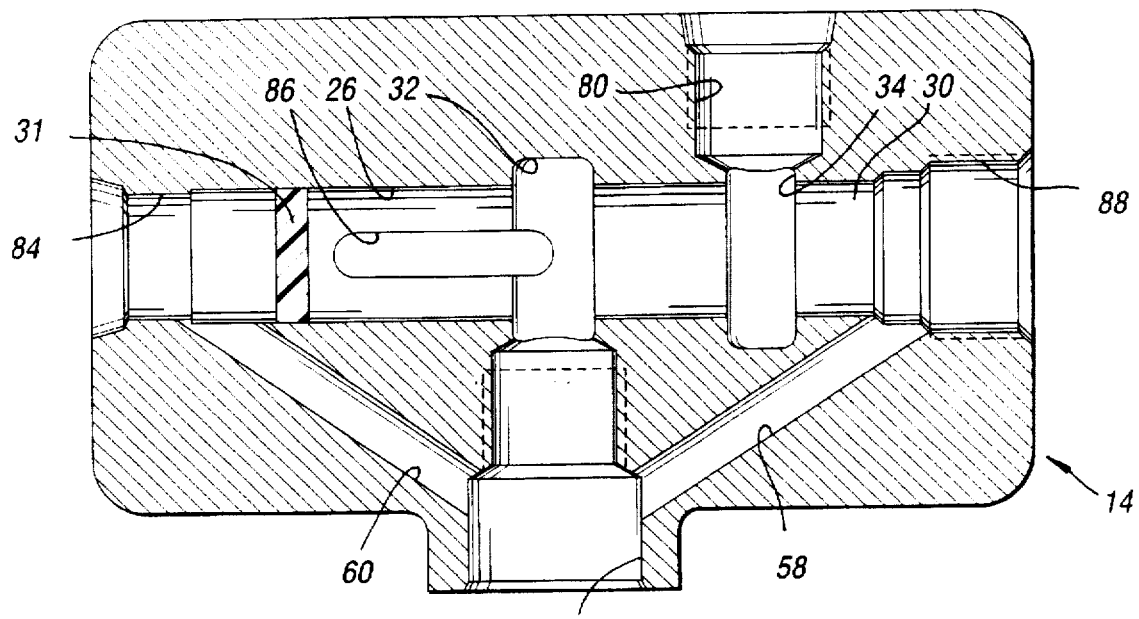
FIG. 6 shows a sectional view of a flow priority valve body and insert in accordance with the present invention.
Figure 7:
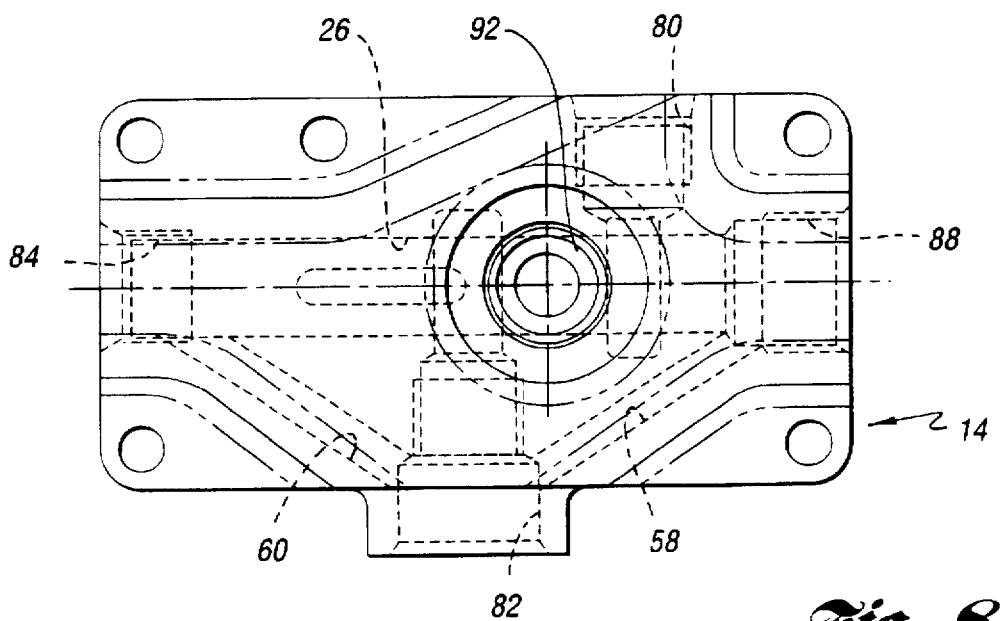
FIG. 7 shows a plan view of a flow priority valve body in accordance with the present invention.
Figure 8:
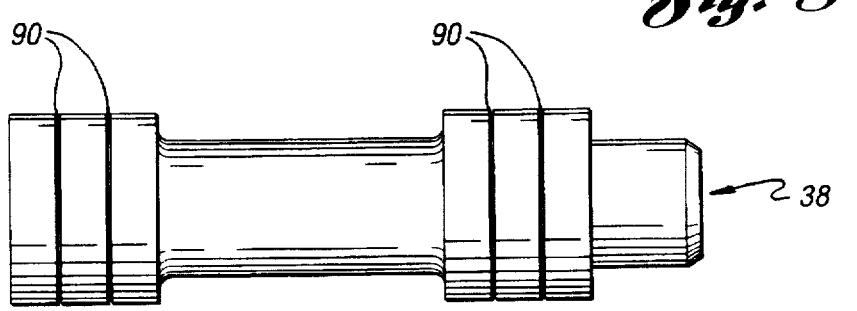
FIG. 8 shows a plan view of a spool for use in a flow priority valve in accordance with the present invention.

Referring to FIGS. 6–8, the preferred embodiment of the valve body 14 and spool 38 is shown. FIGS. 6 and 7 show that the steel valve body 14 includes the bore 26 for receiving the spool 38. A first aperture 80 receives a secondary device plug, which is communicated to the bore 26 through the second annular channel 34. The second end 30 of the bore 26 receives the plug 22 and spring 48 (see FIG. 2). The third conduit 58 communicates the second end 30 of the bore 26 to the EVO output 52 (see FIG. 2). The electronically variable orifice 12 is received within the second aperture 82. The fourth conduit 60 connects the EVO output 52 (see FIG. 2) to the primary device 62, which is received within the third aperture 84. The first annular channel 32 selectively communicates the bore 26 with the EVO input 50. The side channel 86 connects the first end 28 of the bore 26 to the EVO input 50 through the annular channel 32. The fourth aperture 88 receives the stop plug 22. Finally, as shown in FIG. 7, the input aperture 92 receives the input plug.

As shown in FIG. 8, the spool 38 includes annular grooves 90 for stability.

The electronically variable orifice 12 is preferably an EVO manufactured by Lectron Products, Inc. of Rochester Hills, Mich. This EVO is simply a solenoid with a movable needle disposed within the solenoid. When the solenoid is energized, it moves the needle into a cylinder which has radial openings therethrough. As the coil is energized, the needle moves into the cylinder against the force of the oncoming fluid flow, and selectively blocks the radial openings thus selectively restricting flow through the radial openings. In this manner, the flow orifice size may be electronically adjusted.

While the best modes for carrying out the invention have been described in detail, those familiar with the art to which this invention relates will recognize various alternative designs and embodiments for carrying out the invention within the scope of the appended claims. It will also be understood that the words used are words of description rather than limitation and that various changes may be made without departing from the spirit and scope of the invention disclosed.

What is claimed is:

1. A flow priority valve for receiving an input fluid flow and dividing the fluid flow between a primary device and a secondary device, comprising:

a valve body having a bore formed therein, said bore having first and second ends and first and second annular channels formed in communication with said bore, said valve body further having an input flow channel formed in communication with said bore for receiving the input fluid flow;

a spool movable within said bore and having a first land and a second land adjacent opposing ends of said spool;

a spring positioned within said bore for biasing said spool toward said first end of said bore;

an electronically variable orifice (EVO) for electronically adjusting flow, said EVO having an EVO input portion and an EVO output portion, said EVO input portion being in fluid communication with both said first annular channel and said first end of said bore, and said EVO output portion being in fluid communication with both said second end of said bore and the primary device;

said second annular channel being in fluid communication with said secondary device; and said first and second lands being movable with said spool for selectively limiting flow from said bore to said first and second annular channels, respectively.

2. The flow priority valve of claim 1, further comprising a plug secured within said bore at said second end of said bore.

3. The flow priority valve of claim 1, wherein said first and second lands are formed by first and second enlarged cylindrical portions formed coaxially with said spool, and each having a plurality of annular grooves formed therearound.

4. The flow priority valve of claim 1, further comprising an insert positioned within said bore at said first end of said bore.

5. The flow priority valve of claim 1, wherein said valve body comprises steel.

6. A flow priority circuit comprising:

a reservoir;

a pump in fluid communication with said reservoir;

a priority valve in fluid communication with said pump;

a primary device in fluid communication between said priority valve and said reservoir;

a secondary device in fluid communication between said priority valve and said reservoir; and wherein said priority valve comprises:

a valve body having a bore formed therein, said bore having first and second ends and first and second annular channels formed in communication with said bore, said valve body further having an input flow channel formed in communication with said bore for receiving the input fluid flow;

a spool movable within said bore and having a first land and a second land adjacent opposing ends of said spool;

a spring positioned within said bore for biasing said spool toward said first end of said bore;

an electronically variable orifice (EVO) for electronically adjusting flow, said EVO having an EVO input and an EVO output, said EVO input being in fluid communication with both said first annular channel and said first end of said bore, and said EVO output being in fluid communication with both said second end of said bore and the primary device;

said second annular channel being in fluid communication with said secondary device; and said first and second lands being movable with said spool for selectively limiting flow from said bore to said first and second annular channels, respectively.

7. The flow priority circuit of claim 6, further comprising a plug secured within said bore at said second end of said bore.

8. The flow priority circuit of claim 6, wherein said first and second lands are formed by first and second enlarged cylindrical portions formed coaxially with said spool, and each having a plurality of annular grooves formed therearound.

9. The flow priority circuit of claim 6, further comprising an insert positioned within said bore at said first end of said bore.

10. The flow priority circuit of claim 6, wherein said valve body comprises steel.

11. The flow priority circuit of claim 6, wherein said pump is a constant flow rate pump.

12. The flow priority circuit of claim 6, wherein said primary device is a vehicle steering gear.

13. A flow priority valve for receiving an input fluid flow and dividing the fluid flow between a primary device and a secondary device, comprising:

a steel valve body having a bore formed therein, said bore having first and second ends and first and second annular channels formed in communication with said bore, said valve body further having an input flow channel formed in communication with said bore for receiving the input fluid flow;

a spool movable within said bore and having first and second enlarged cylindrical portions which form first and second lands adjacent opposing ends of said spool, said first and second enlarged cylindrical portions each having a plurality of annular grooves formed therearound;

a plug secured within said bore at said second end of said bore;

a spring positioned within said bore for biasing said spool toward said first end of said bore;

an insert positioned within said bore at said first end of said bore;

an electronically variable orifice (EVO) for electronically adjusting flow, said EVO having an EVO input and an EVO output, said EVO input being in fluid communication with both said first annular channel and said first end of said bore, and said EVO output being in fluid communication with both said second end of said bore and the primary device;

said second annular channel being in fluid communication with said secondary device; and said first and second lands being movable with said spool for selectively limiting flow from said bore to said first and second annular channels, respectively.

* * * * *